(No Model.)

H. G. MICKLE.
TWO WHEELED VEHICLE.

No. 279,968. Patented June 26, 1883.

WITNESSES.
H. J. Everett
G. Koehler

INVENTOR
Henry G. Mickle
by Smith & Loeper
attys

UNITED STATES PATENT OFFICE.

HENRY G. MICKLE, OF NEW PALESTINE, INDIANA.

TWO-WHEELED VEHICLE.

SPECIFICATION forming part of Letters Patent No. 279,968, dated June 26, 1883.

Application filed March 26, 1883. (No model.)

*To all whom it may concern:*

Be it known that I, HENRY G. MICKLE, a citizen of the United States, residing at New Palestine, Hancock county, and State of Indiana, have invented new and useful Improvement in Sulkies and Two-Wheel Vehicles, of which the following is a correct specification.

My invention relates to improvements in sulky-vehicles wherein the body and seat rest upon springs supported by shackles attached to the running-gears of two-wheel vehicles, as hereinafter described, the object being to so suspend the body of two-wheeled vehicles to the running-gears that its own gravity will prevent the jolting occasioned by the movement of the horse experienced in all ordinary sulkies.

Figure 1:
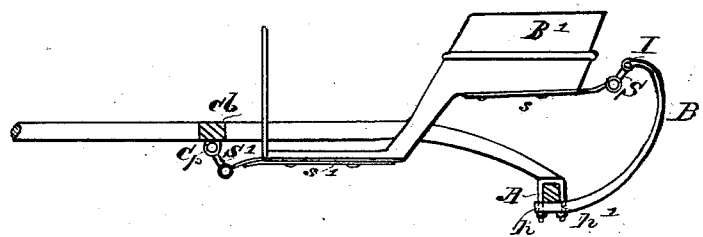
Figure 2:
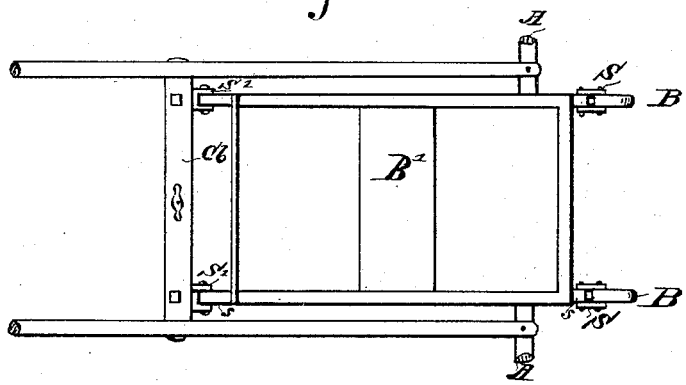

Referring to the accompanying drawings, which are made a part of this specification, and in which similar letters of reference refer to similar parts of my invention, Figure 1 represents a side view of my invention as attached to the running-gears of an ordinary two-wheeled vehicle. Fig. 2 represents a plan view of the same.

In Fig. 1, B' represents the body of the sulky, provided with springs $s\ s'$, firmly attached to the bottom of the same, said springs $s\ s'$ terminating at the outer ends in eyes to receive shackle-bolts for supporting-shackles S S', which shackles are suspended in front by means of a bolt passing through the clip C, fastened to bar Cb, and in the rear to the curved supporting-bar B by means of bolt and hinge or knuckle joint I, provided at the upper end of bar B to receive the same, said curved supporting-bar B being firmly bolted to the axle A, as shown in the figure alluded to.

The device is so adjusted that the shackles will incline inwardly, by means of which it will be readily seen that the body of the sulky thus suspended between the supporting-bar B and the clip C will by its own gravity remain comparatively free from the jolting occasioned by the movements of the horse, as is experienced in sulkies in ordinary use.

The whole of my invention may be constructed of steel or any suitable material.

I am aware that shackles have been used to connect buggy-springs with axles in four-wheeled vehicles; but I am not aware that the same have been applied to two-wheeled vehicles in such a manner as to take up the jolting motion occasioned by the movements of the animal drawing the same. Therefore I do not claim the invention of those parts and combinations known to be old; but

What I claim as new, and desire to secure by Letters Patent, is—

In any sulky or two-wheel vehicle, the combination, with body B', supplied with springs $s\ s'$, of the curved supporting-bar B, provided with holes $h\ h'$ and eye I, said bar being firmly attached to axle A, clip Cp, attached to cross-bar Cb, and the inwardly-inclined shackles S S', upon which said body B' is suspended, substantially in the manner and for the purpose set forth.

In witness whereof I have hereunto set my hand and seal this 22d day of March, A. D. 1883.

HENRY G. MICKLE. [L. S.]

In presence of—
CHRISTIAN A. WEBER,
H. J. EVERETT.